US012244738B2

(12) United States Patent
Krovatkina et al.

(10) Patent No.: US 12,244,738 B2
(45) Date of Patent: Mar. 4, 2025

(54) METHODS, DEVICES AND SYSTEMS FOR MANAGING USER AUTHENTICATION IN IIoT ENVIRONMENTS USING HARDWARE TOKENS

(71) Applicant: Schlumberger Technology Corporation, Sugar Land, TX (US)

(72) Inventors: Maria Krovatkina, Houston, TX (US); Anh Dang, Houston, TX (US); Muhammad Moeen Yaqoob, Houston, TX (US); Felipe Klein, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/694,817

(22) PCT Filed: Oct. 22, 2021

(86) PCT No.: PCT/US2021/056130
§ 371 (c)(1),
(2) Date: Mar. 22, 2024

(87) PCT Pub. No.: WO2023/069106
PCT Pub. Date: Apr. 27, 2023

(65) Prior Publication Data
US 2024/0396748 A1    Nov. 28, 2024

(51) Int. Cl.
*H04L 9/32*    (2006.01)
*H04L 9/08*    (2006.01)
(Continued)

(52) U.S. Cl.
CPC .......... *H04L 9/3271* (2013.01); *H04L 9/0825* (2013.01); *H04L 9/3234* (2013.01);
(Continued)

(58) Field of Classification Search
None
See application file for complete search history.

(56) References Cited

U.S. PATENT DOCUMENTS 6,873,988 B2 * 3/2005 Herrmann ............. H04L 63/145
7,702,801 B1 * 4/2010 Kyle ...................... G06F 16/958
709/229
(Continued)

FOREIGN PATENT DOCUMENTS

CN    111585771 A      8/2020
CN    112333214 A  *   2/2021
(Continued)

OTHER PUBLICATIONS

Hongwei Luo, Chao Wang, Hao Luo, Fan Zhang, Feng Lin and Guoai Xu; (G2F: A Secure User Authentication for Rapid Smart Home IoT Management); pp. 12; Published on IEEE in Jan. 11 (Year: 2021).*
(Continued)

*Primary Examiner* — Eleni A Shiferaw
*Assistant Examiner* — Ali H. Cheema
(74) *Attorney, Agent, or Firm* — Jeffrey D. Frantz

(57) ABSTRACT

Methods, devices, and systems are provided for user authentication on a gateway device to perform steps of, receiving a user request communicated via a local area network (LAN) from a user system or device connected to the LAN, checking whether the gateway device is operating in a disconnected operational mode in response to the user request, selectively initiating a user authentication protocol when the gateway device is operating in the disconnected operational mode, wherein the user authentication protocol uses secret information stored in a user hardware token uniquely assigned to a particular user, authenticating the administrator user using the user authentication protocol that requires administrator secret information stored in a master (Continued)

hardware token connected to a system or device operated by the administrator user, and selectively authenticating the particular user based at least in part on results of the user authentication protocol.

14 Claims, 11 Drawing Sheets

(51) Int. Cl.
    *G06F 21/31*     (2013.01)
    *G06F 21/41*     (2013.01)
    *H04L 9/40*     (2022.01)

(52) U.S. Cl.
    CPC .............. *G06F 21/31* (2013.01); *G06F 21/41* (2013.01); *H04L 9/0863* (2013.01); *H04L 9/40* (2022.05); *H04L 63/0815* (2013.01); *H04L 63/0853* (2013.01); *H04L 63/0884* (2013.01)

(56) References Cited

U.S. PATENT DOCUMENTS

| | | | |
|---|---|---|---|
| 2003/0161473 A1* | 8/2003 | Fransdonk | H04L 9/40 380/277 |
| 2006/0039356 A1* | 2/2006 | Rao | H04L 47/2416 370/352 |
| 2006/0101506 A1* | 5/2006 | Gallo | H04L 9/083 726/3 |
| 2011/0103586 A1* | 5/2011 | Nobre | H04L 9/3234 380/270 |
| 2012/0290436 A1* | 11/2012 | Frost | G06Q 30/06 709/213 |
| 2013/0267171 A1* | 10/2013 | Sarkar | G06Q 10/00 455/41.1 |
| 2014/0025747 A1* | 1/2014 | Sarkar | H04W 4/21 709/204 |
| 2015/0326563 A1* | 11/2015 | Chan | H04N 21/4367 713/172 |
| 2016/0094543 A1* | 3/2016 | Innes | H04L 63/0823 726/6 |
| 2016/0094546 A1* | 3/2016 | Innes | H04L 63/0876 713/156 |
| 2016/0127372 A1* | 5/2016 | Unterschuetz | H04L 12/2836 726/4 |
| 2016/0164831 A1* | 6/2016 | Kim | H04L 67/56 709/223 |
| 2016/0285717 A1* | 9/2016 | Kim | H04L 41/0631 |
| 2017/0070563 A1* | 3/2017 | Sundermeyer | H04L 67/025 |
| 2017/0094033 A1 | 3/2017 | Sathyadevan et al. | |
| 2017/0154333 A1* | 6/2017 | Gleeson | H04L 63/0823 |
| 2017/0344703 A1* | 11/2017 | Ansari | H04L 67/55 |
| 2019/0158304 A1* | 5/2019 | Sundermeyer | H04L 12/2818 |
| 2020/0274866 A1* | 8/2020 | Vilmos | H04L 9/32 |
| 2020/0410433 A1* | 12/2020 | Rahilly | G06F 21/35 |
| 2020/0410801 A1* | 12/2020 | Rahilly | E05B 47/0001 |
| 2021/0383631 A1* | 12/2021 | Rahilly | G07F 17/0092 |

FOREIGN PATENT DOCUMENTS

| | | | |
|---|---|---|---|
| JP | 2005348164 A | * 12/2005 | |
| WO | WO-2019015598 A1 | * 1/2019 | ........... G06F 16/958 |

OTHER PUBLICATIONS

Arwa Badhib, Suhair Alshehri and Asma Cherif; (A Robust Device-to-Device Continuous Authentication Protocol for the Internet of Things); p. 25; Published on IEEE in Sep. 6 (Year: 2021).*
Abdulrahman Bin Rabiah et al.; "A Lightweight Authentication and Key Exchange Protocol for IoT"; Conference: Workshop on Decentralized IoT Security and Standards; Sep. 8, 2018; 6 pages.
Hongwei Luo et al.; "G2F: A Secure User Authentication for Rapid Smart Home IoT Management"; IEEE Internet of Things Journal (vol. 8, Issue: 13, Jul. 1, 1, 2021), Jan. 11, 2021; pp. 10884-10889.
Search Report and Written Opinion of International Patent Application No. PCT/US2021/056130; Dated Jul. 13, 2022; 12 pages.

* cited by examiner

METHODS, DEVICES AND SYSTEMS FOR MANAGING USER AUTHENTICATION IN IIoT ENVIRONMENTS USING HARDWARE TOKENS

CROSS-REFERENCE TO RELATED APPLICATIONS

The present application is a National Stage Entry of International Application No. PCT/US2021/056130, filed Oct. 22, 2021.

BACKGROUND

The subject disclosure relates to the field of network security in Industrial Internet of Things (IIoT) environments.

In IIoT environments, a distributed computing platform can be used for operational surveillance, diagnostics, optimization, and management of physical industrial assets that are located remotely from both a corporate data network and from one or more cloud computing environments. For example, in oilfield applications, the distributed computing platform can be configured to interface to a variety of sensor and control instrumentation used in oilfield equipment (such as pumps, valves, actuators, etc.) at a remote well site or facility and implement various communication protocols to connect such sensor and control instrumentation to the corporate data network and/or the cloud computing environment(s) to provide for monitoring, diagnostics, control and management of the oilfield equipment.

In an embodiment shown in FIG. 1, the distributed computing platform can embody a gateway device 11 that resides at an industrial site or facility 13. The gateway device 11 is operably coupled (or interfaces) to one or more systems 15 (e.g., industrial control systems) located at the industrial site or facility 13. For example, gateway device 11 can be configured with one or more bi-directional communication interfaces to the one or more systems 15 using a wired communication protocol and/or a wireless communication protocol. The gateway device 11 can also be configured with one or more bi-directional communication interfaces to one or more WANs 17. The WAN(s) 17 can include one or more private WANs and/or the public Internet. The WAN(s) 17 can provide for data communication between the gateway device 11 and one or more cloud computing environment(s) 19. The WAN(s) 17 can also provide for data communication between the gateway device 11 and one or more corporate data centers or networks 21.

The gateway device 11 can be configured to deliver performance edge computing and/or secure data ingestion. For example, the edge computing and/or data ingestion can support or enable real-time monitoring and control of the system(s) 15 at the site or facility 13. As part of the edge computing function performed by the gateway device 11, the gateway device 11 can be configured to execute one or more applications locally on the gateway device 11 and/or store data locally on the gateway device 11. Providing for secure and reliable user access to such local application(s) and data is important for IIoT applications and environments and can be difficult to accomplish, particularly in a disconnected operational mode where connection of the gateway device 11 to the WAN(s) 17 is broken or impaired or otherwise not working properly.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with aspects herein, methods, devices, and systems are provided for user authentication on a gateway device located at an industrial site or facility. The gateway device includes a southbound data communication interface to at least one local area network (LAN) at the industrial site or facility and a northbound data communication interface to at least one wide area network (WAN). The gateway device is configured to perform a user authentication process that involves, i) receiving a user request communicated via the LAN from a user system or device connected to the LAN;

ii) checking whether the gateway device is operating in a disconnected operational mode in response to the user request of i);

iii) selectively initiating a user authentication protocol when the gateway device is operating in the disconnected operational mode, wherein the user authentication protocol uses secret information stored in a user hardware token uniquely assigned to a particular user; and iv) selectively authenticating the particular user based at least in part on results of the user authentication protocol of iii).

In embodiments, the secret information stored in the user hardware token can include a secret key.

In embodiments, the user authentication protocol can use other user information associated with the secret information of the user hardware token and stored in the gateway device.

In embodiments, the user hardware token can be configured to securely store a cryptographic public-private key pair with the private key of the key pair being the secret information stored in a user hardware token, and the public key of the key pair being the other information associated with the secret information of the user hardware token and stored in the gateway device.

In embodiments, the user authentication protocol can be a challenge-response protocol based on the cryptographic public-private key pair securely stored by the user hardware token.

In embodiments, the user hardware token can be registered at the gateway device and the other user information associated with the secret information of the user hardware token can be stored in the gateway device via interaction of an administrator user with the gateway device.

In embodiments, the gateway device can be configured to automatically (i.e., without human involvement) synchronize or push information regarding the registered user token to a cloud computing environment for storage thereon. The information regarding the registered user token can include the other user information associated with the secret information of the user hardware token.

In embodiments, the gateway device can be configured to authenticate the administrator user before registering the user hardware token, wherein the authentication of the administrator user employs a user authentication protocol that requires secret information stored in a master hardware token connected to a system or device operated by the administrator user.

In embodiments, the user authentication protocol that requires secret information stored in the master hardware token is used when the gateway device is operating in a disconnected operational mode.

In embodiments, the master hardware token can be uniquely associated with a particular gateway device and used for authenticating an administrator user on the particular gateway device and permitting the administrator user to manage user hardware tokens via interaction with the particular gateway device.

In embodiments, the user hardware token can be registered at a cloud computing environment and the other user information associated with the secret information of the user hardware token can be stored in the cloud computing environment via interaction of an administrator user with the cloud computing environment.

In embodiments, the cloud computing environment can be configured to automatically (i.e., without human involvement) synchronize or push information regarding the registered user hardware token to the gateway device for storage on the gateway device. The information regarding the registered user hardware token can include the other user information associated with the secret information of the registered user hardware token. The information regarding the registered user hardware token can further include role-based permission data.

In embodiments, in registering the user hardware token at the cloud computing environment, the user hardware token can be deployed to a particular gateway device or group or gateway devices based on input from the administrator user. The destination of the automatic synchronizing or pushing of the information regarding the registered user token at the cloud computing environment can be configured to include the particular gateway device or group or gateway devices to which the user hardware token is deployed.

In embodiments, the cloud computing environment can be configured to register new user hardware tokens and changes or revocation of registered user hardware tokens, and to automatically (i.e., without human involvement) synchronize or push information regarding the newly registered user hardware token or changes or revocation of registered user hardware tokens to the gateway device for update of the corresponding user hardware token information stored on the gateway device.

In embodiments, the gateway device can be configured to control access to at least one application or data on the gateway device based on the selective authentication of the particular user in iv). In embodiments, the gateway device can be configured to store role-based permission data for authorized users of the gateway device, and the access control can be further based on role-based permission data for the particular user as stored on the gateway device.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
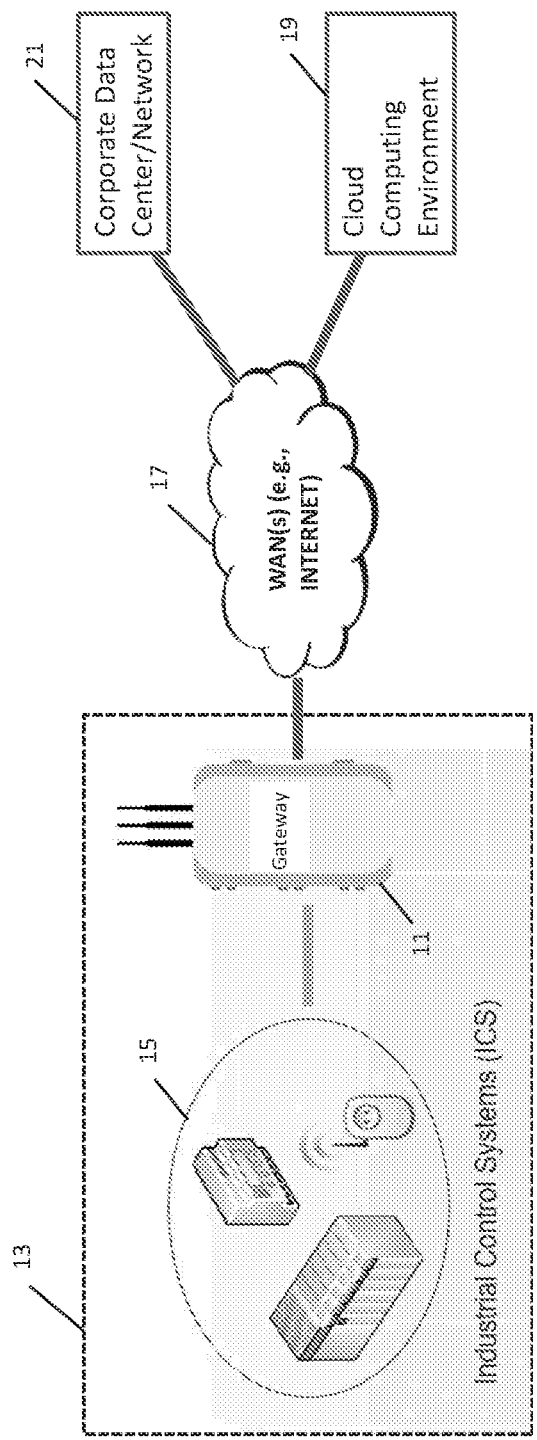
FIG. 1 is a schematic illustration of a gateway device suitable for IIoT environments, which connects industrial control systems (ICS) to a cloud computing environment as well as to a corporate data center or network.
Figure 2:
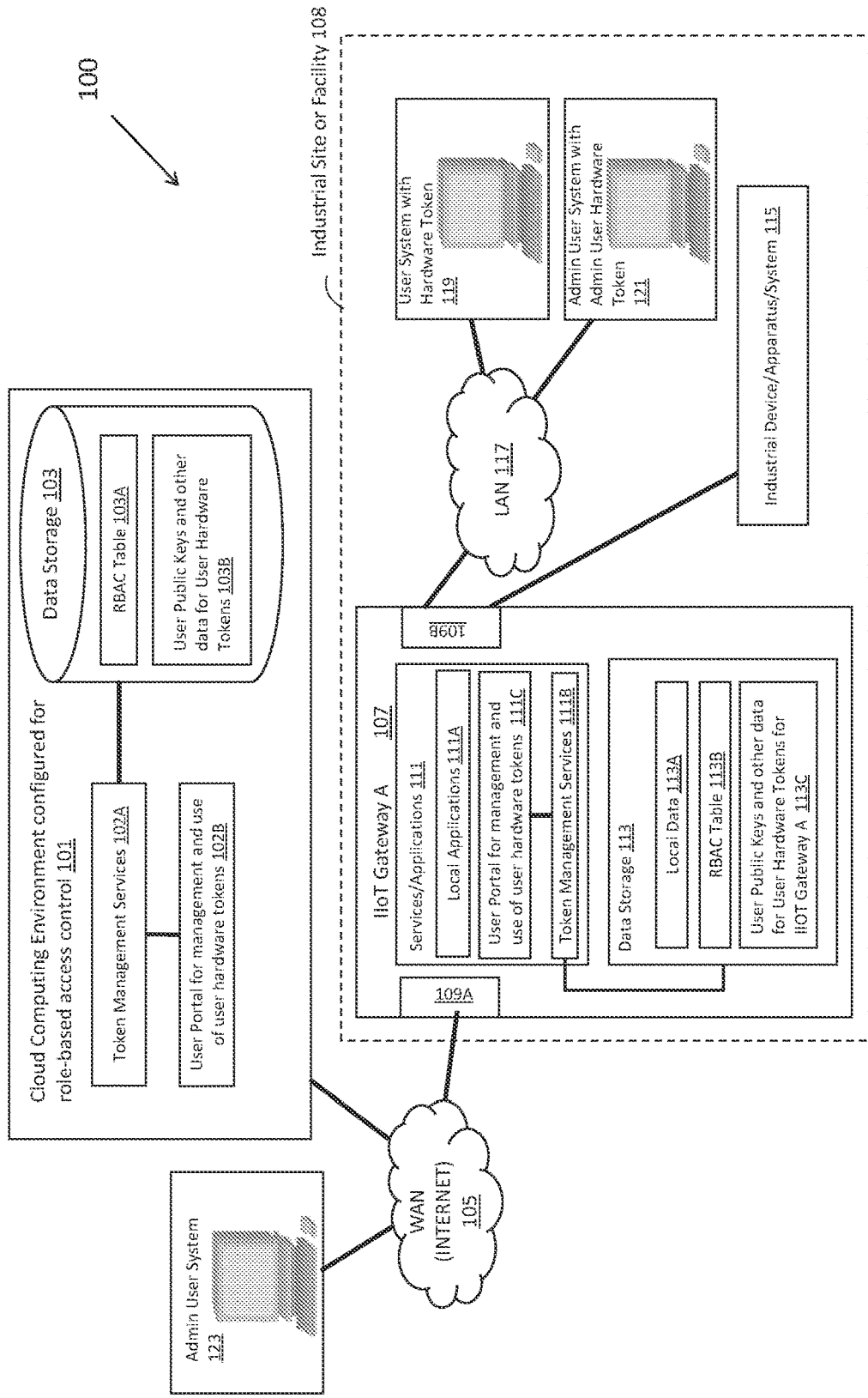
FIG. 2 is a schematic diagram of a system for managing user authentication in an IIoT environment with the use of hardware tokens in accordance with the present disclosure. The system can be used to provide secure user authentication and to control user access to one or more applications that execute locally on a gateway device and/or to data stored locally on the gateway device, particularly in a disconnected operational mode as described herein.

FIG. 2 illustrate a system 100 for managing user authentication in an IIoT environment with the use of hardware tokens. System 100 can be used to provide secure user authentication and control user access to one or more applications that execute locally on a gateway device and/or to data stored locally on the gateway device. System 100 includes two separate functions (or collection of services) that register and maintain hardware tokens for users and link or map the data pertaining to the hardware token for a particular user to role-based permissions for that particular user. The first collection of services is implemented by a cloud-computing environment and is configured as a primary (default) mechanism that registers and maintains hardware tokens for users and links or maps the data pertaining to the hardware token for a particular user to role-based permissions for that particular user. The first collection of services is also configured to provide secure user authentication and associated user access control to the application(s) that execute locally on a gateway device and/or to data stored locally on the gateway device. The second collection of services is implemented by the gateway device and is configured as a secondary mechanism that registers and maintains hardware tokens for users and links or maps the data pertaining to the hardware token for a particular user to role-based permissions for that particular user. The second collection of services is also configured to provide secure user authentication and associated user access control to the application(s) that execute locally on a gateway device and/or to data stored locally on the gateway device. In embodiments, the functionality of the first collection of services (primary mechanism) is selectively invoked or used in a connected operational mode of the gateway device where the gateway device is operably connected to the cloud-computing environment via one or more WAN(s), and the functionality of the second collection of services (secondary mechanism) is selectively invoked or used in a disconnected operational mode of the gateway device where the gateway device is disconnected (or non-operably connected where the connection is malfunctioning or impaired) to the cloud-computing environment via one or more WAN(s).

In order to provide for secure and reliable user access to the applications executing locally on the gateway device and/or to the data stored locally on the gateway device in the disconnected operational mode of the gateway device, the second collection of services implemented on the gateway device is configured to provide a user authentication process that verifies the identity of a user using a hardware token for that user. As used herein, a hardware token is a physical device that is assigned or associated with a user and includes secure electronic memory that is configured to store user authentication information (e.g., secrets and keys) in a proper format for securely authenticating the user using one or more user authentication protocols. In embodiments, the user authentication information can include cryptographic public-private keys and/or other secret keys and/or digital certificates and/or passwords or PIN or other data that is used to authenticate the user. In embodiments, the user authentication protocols can embody a challenge-response protocol based on user-assigned public-private cryptographic keys or other user-assigned secret keys, user authentication protocols based on user-assigned digital certificates, the U2F protocol, the FIDO2 protocol, and possibly other user authentication protocols. The hardware token can be operably coupled to a compatible device or system operated by the user (such as a computing system, notebook, tablet, or mobile phone) and used in conjunction with the device or system to authenticate the user to prove the identity of the user. The functionality that couples the hardware token to the device or system can employ a Universal Serial Bus (USB) connection, a Near Field Communication (NFC) connection, a BLUETOOTH® wireless connection, or other suitable interface. The hardware token can also include other functionality, such as an externally accessible touch sensor for touch input, or an externally accessible finger sensor for input of biometric fingerprint information of the user. Examples of commercially available hardware tokens include various Yubikey tokens sold by Yubico of Palo Alto, CA, and the Google Titan Key sold by Google, Inc. of Mountain View, CA.

In the system 100 of FIG. 2, a gateway device 107 (labeled "IIoT Gateway A") resides at an industrial site or facility 108. The gateway device 107 is operably coupled (or interfaces) to one or more industrial devices or apparatus or systems 115 (e.g., industrial control systems) located at the industrial site or facility 108. The gateway device 107 includes one or more southbound communication interfaces 109B that provide bi-directional communication to the industrial devices or apparatus or systems 115 using a wired communication protocol (such as a serial, Ethernet, Modbus, or Open Platform Communication (OPC) protocol) and/or a wireless communication protocol (such as IEEE 802.11 Wi-Fi protocol, Highway Addressable Remote Transducer Protocol (HART), LoraWAN, or Message Queuing Telemetry Transport (MQTT)). The southbound communication interface(s) 109B can also provide bi-directional communication to one or more LAN(s) 117 located at the industrial site or facility 108 using a wired communication protocol (such as Ethernet) and/or a wireless communication protocol (such as one or more IEEE 802.11 Wi-Fi protocols). In embodiments, the southbound communication interface(s) 109B can include an Ethernet controller (i.e., MAC & PHY components) embodied by system-on-chip functionality or other integrated circuit functionality. The southbound communication interface(s) 109B can also include a Wi-Fi transceiver embodied by system-on-chip functionality or other integrated circuit functionality. Additionally or alternatively, one or more components of the southbound communication interface(s) 55 can be embodied by a separate unit external to the gateway device 107. One or more user devices (e.g., two labeled 119, 121) can be located at the industrial site or facility 108 and operably coupled to the LAN(s) 117 for communication to the gateway device 107 via the LAN(s) 117 and the southbound communication interface(s) 109B of the gateway device 107. Other local devices (not shown), such as smart sensors, computer-based systems, industrial control systems, or other networked devices and systems, can be located at the industrial site or facility 108 and operably coupled to the LAN(s) 117 for communication to the gateway device 107 via the LAN(s) 117 and the southbound communication interface(s) 109B of the gateway device 107.

The gateway device 107 also includes one or more northbound communication interfaces 109A that provide bi-directional communication to one or more WANs 105. For example, the northbound communication interface(s) 109A can provide a bi-directional wired communication interface to an Ethernet-based WAN. Additionally or alternatively, the northbound communication interface(s) 109A can provide a bi-directional wireless communication interface to a Wi-Fi-based WAN. Additionally or alternatively, the northbound communication interface(s) 109A can provide a bi-directional wireless communication interface to a cellular WAN. Additionally or alternatively, the northbound communication interface(s) 109A (or an external device) can provide a bi-directional wireless satellite link to a satellite-based WAN (such as BGAN). The WAN(s) 105 can include one or more private WANs and/or the public Internet. The WAN(s) 105 can support broadband connections, such as digital subscriber lines (DSL), and DOCSIS cable modems, and cellular wireless access connections such as LTE and 5G. The WAN(s) 105 can also support other connections, such as MPLS lines, T1 and T3 lines, OC3 lines, OC48 lines, and fiber-optic connections. The WAN(s) 105 typically employ one or more routing protocols to facilitate the efficient routing of data packets over the WAN(s) 105. Non-limiting examples of such routing protocols include Border Gateway Protocol (BGP), Routing Information Protocol (RIP), Interior Gateway Routing Protocol (IGRP), Enhanced IGRP (EIGRP), and Open Shortest Path First (OSPF). The WAN(s) 105 can provide for data communication between the gateway device 107 and one or more cloud computing environments, such as the cloud computing environment 101. The WAN(s) 105 can also provide for data communication between the gateway device 107 and one or more corporate data centers or networks (not shown).

The gateway device 107 can be configured to deliver performance edge computing and/or secure data ingestion. For example, the edge computing and/or data ingestion can support or enable real-time monitoring and control of the industrial devices or apparatus or systems 115 or other local devices or systems located at the industrial site or facility 108. As part of the edge computing function performed by the gateway device 107, the gateway device 107 can be configured to execute one or more applications 111A locally on the gateway device 107 and/or store data 113A locally on the gateway device 107. Computer systems that belong to the corporate data network and/or the cloud computing environment 101 (or other cloud computing environment)

can be used to securely provision, configure and manage the gateway device 107 and its components over its operational lifetime.

It is assumed that gateway device 107 can operate in both the connected and disconnected operational modes over time. In the connected operational mode, the gateway device 107 is operably connected to the cloud-computing environment 101 via the WAN(s) 105. In the disconnected operational mode, the gateway device 107 is disconnected (or non-operably connected) to the cloud-computing environment 101 via the WAN(s) 105. In order to provide for secure and reliable user access to the applications 111A executing locally on the gateway device 107 and/or to the data 113A stored locally on the gateway device 107 in the disconnected operational mode, the gateway device 107 can be configured to implement a user authentication process that verifies the identity of a user using a hardware token for that user. In embodiments, the user authentication information stored by the hardware token for a given user can include a cryptographic public-private key pair assigned to the given user, and the user authentication protocol supported by the hardware token and used by the user authentication process can employ a challenge-response protocol that uses the cryptographic public-private key pair assigned to the user and stored by the hardware token for that user.

In order to support the user authentication process performed at the gateway device 107 in the disconnected operational mode, system 101 can include two separate functions (or collection of services) that register and maintain hardware tokens for users and link or map the data pertaining to the hardware token for a particular user to role-based permissions for that particular user. In embodiments, such user-specific role-based permissions can be stored in a Role-based Access Control (RBAC) table.

The first collection of services is implemented in the cloud-computing environment 101 and includes token management services 102A and a user portal 102B as shown in FIG. 2. The token management services 102A includes software functionality configured to track an inventory of hardware tokens and manage the assignment of hardware tokens and associated public key-private key pairs on a per-user basis. The token management services 102A is configured to interact with data storage 103 to access and update the role-based permission data (e.g., Role-based Access Control (RBAC) table 103A) as well as the user public keys and other hardware token data 103B of the system stored in the data storage 103 as needed.

In embodiments, the token management services 102A and a user portal 102B can manage the hardware tokens and associated public key-private key pairs as well as role-based permissions data that controls user access to multiple gateway devices. The gateway devices can be the same type of device as gateway 107 or provide similar functionality. The multiple gateway devices can be geographically dispersed over different industrial sites or locations. Alternatively or additionally, multiple gateway devices can be located at the same industrial site or location. In order to support multiple gateway devices, the per-user permission data (e.g., Role-based Access Control (RBAC) table 103A) and/or the user hardware token data 103B managed by the token management services 102A and a user portal 102B can be configured to track deployment of a user-specific hardware token to one or more particular gateway devices. If and when a user-specific hardware token is deployed for a particular gateway, that user-specific hardware token can be used for user authentication in the disconnected operational mode for that particular gateway. Otherwise (when the user-specific hardware token is not deployed for the particular gateway), that user-specific hardware token cannot be used for user authentication in the disconnected operational mode for that particular gateway.

In embodiments, the token management services 102A can be further configured with one or more application programming interfaces (APIs) used by the user portal 102B. The user portal 102B includes software functionality configured to provide for browser-based interaction with users for the management and use of the user hardware tokens. The user portal 102C can employ the APIs of the token management services 102A to provide the functionality that manages and uses the user hardware tokens. For example, the APIs can enable an administrator user to drill down and select a particular gateway and visualize the hardware tokens currently deployed to the selected gateway. In another example, a new hardware token can be added via another user interface that might allow the administrator user to use/assign an existing hardware token from the inventory. In another example, the administrator user can upload details for a new hardware token not in the inventory. In yet another example, the administrator user can remove or disable a hardware token from inventory. In these operations, the token management services 102A can be configured to commit any necessary changes or updates to the per-user permission data (e.g., Role-based Access Control (RBAC) table 103A) and/or the token data 103B stored in the data storage 103, and propagate proper status (e.g., success, timeout, failed, etc.) back through the involved components for visualization on the user portal 102C. Furthermore, the APIs can provide the necessary exchange of user credential information and permission data to enable the user portal 102B to authenticate a user and control access to the application(s) 111A executing locally on the gateway device 107 (and possibly to application(s) executing locally on other gateway devices) and/or control access to the data 113A stored locally on the gateway device 107 (and possibly to data stored locally on other gateway devices).

The second collection of services can be implemented in the gateway device 107 and includes token management services 111B and a user portal 111C as shown in FIG. 2. Similar to the token management services 102A, the token management services 111B includes software functionality configured to track an inventory of hardware tokens deployed on the gateway 107 and manage the assignment of hardware tokens and associated public key-private key pairs on a per user basis. The token management services 111B interacts with data storage 113 of the gateway 107 to access and update the role-based permission data (e.g., Role-based Access Control (RBAC) table 113B) as well as the user public keys and hardware token data 113C stored in the data storage 113 as needed. The per-user permission data (e.g., Role-based Access Control (RBAC) table 113B) and/or the user hardware token data 113C can be configured to track the deployment of a user-specific hardware token to the particular gateway device 107. Thus, if and when a user-specific hardware token is deployed on the particular gateway 107, that user-specific hardware token can be used for user authentication in the disconnected operational mode of the particular gateway device. The token management services 111B can be further configured with one or more APIs used by the user portal 111C. The user portal 111C includes software functionality configured to provide for browser-based interaction with users for the management and use of user hardware tokens. The user portal 111C can employ the APIs of the token management services 111B to provide the functionality that manages and uses the user hardware tokens deployed on the gateway device 107. For example, the user portal 111C can enable an administrator user to visualize the hardware tokens currently deployed on the gateway device 107. In another example, a hardware token can be added via another user interface that may allow the administrator user to use/assign an existing hardware token from the inventory and deploy it on the gateway device 107. In another example, the administrator user can upload details for a new hardware token not in the inventory and deploy it on the gateway device 107. In yet another example, the administrator user can remove or disable a hardware token deployed on the gateway device 107. In these operations, the token management services 111B can be configured to commit any necessary changes or updates to the per-user permission data (e.g., Role-based Access Control (RBAC) table 113B) and/or the hardware token data 113C stored in the data storage 113, and propagate proper status (e.g., success, timeout, failed, etc.) back through the involved components for visualization on the user portal 111C. Furthermore, the APIs can provide the necessary exchange of user token information and permission data to enable the user portal 111C to authenticate a user and control access to the application(s) 111A executing locally on the gateway device 107 and/or control access to the data 113A stored locally on the gateway device 107.

Figure 3A:
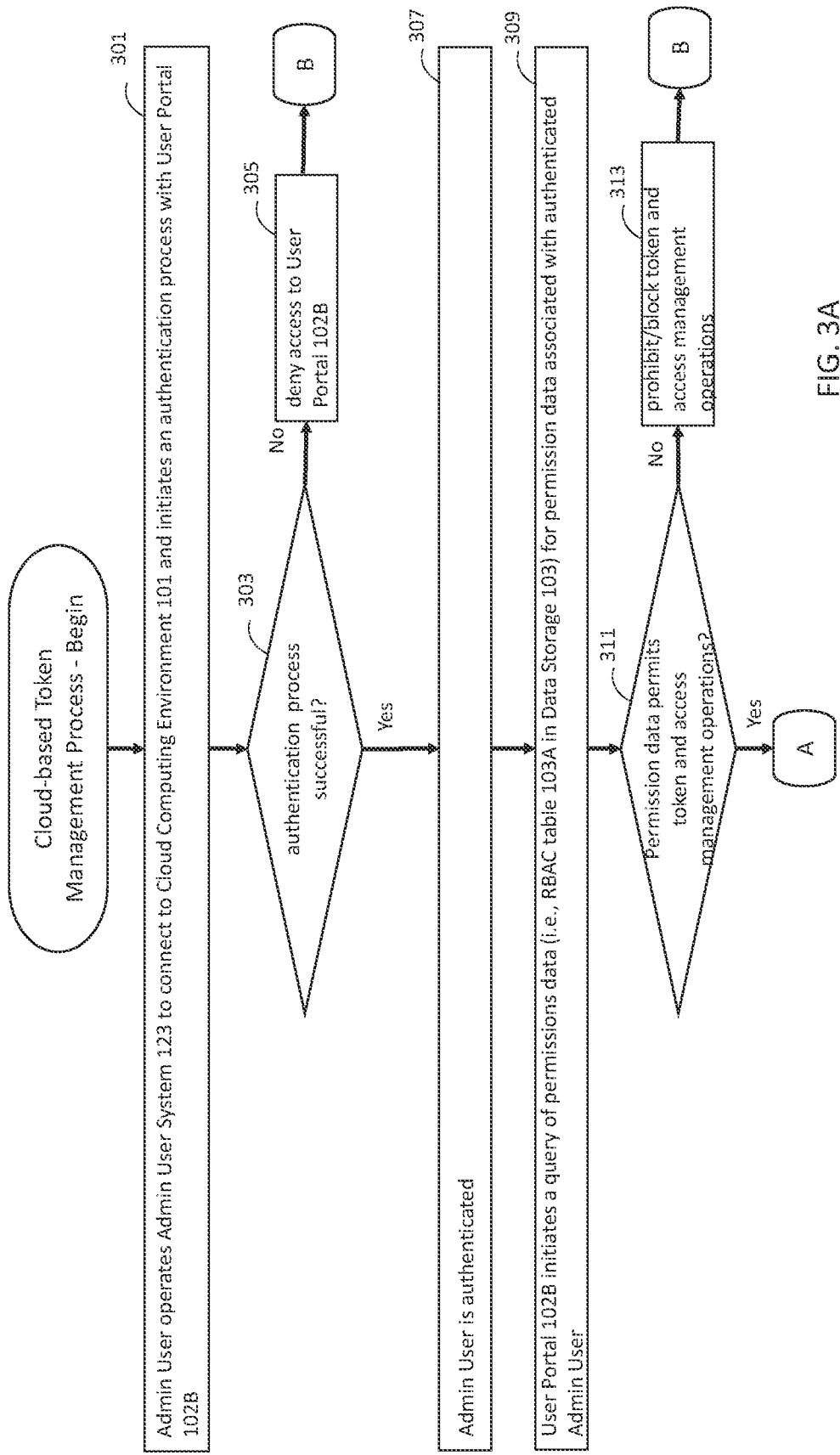
FIGS. 3A and 3B, collectively, is a flow chart of a cloud-based token management process that can be implemented by the cloud computing environment of FIG. 2 in accordance with the present disclosure.
Figure 3B:
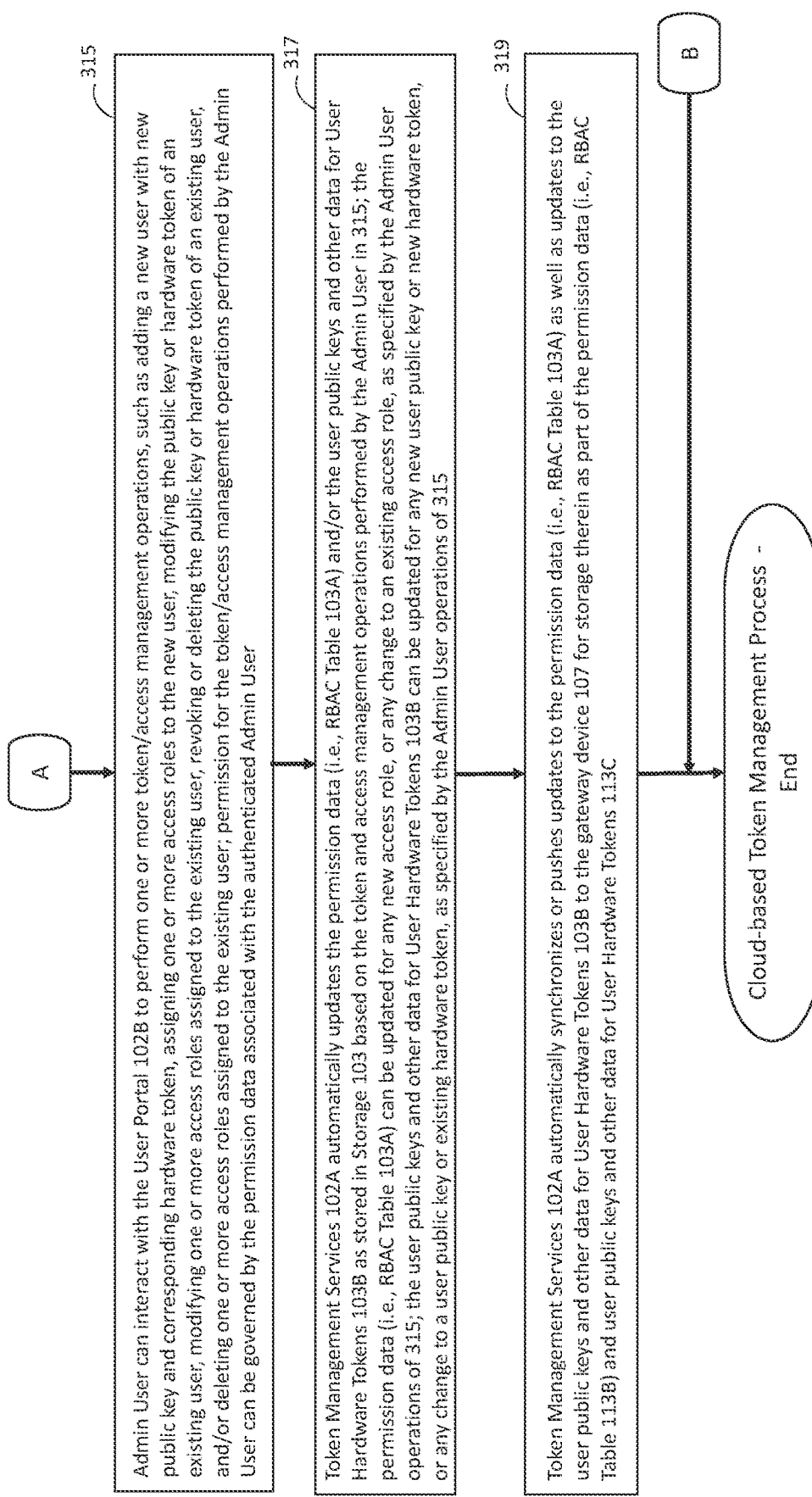

In embodiments, the first collection of services (i.e., token management services 102A and user portal 102B) implemented in the cloud-computing environment 101 can be configured to perform a cloud-based token management process as illustrated in the flowchart of FIGS. 3A-3B.

More specifically, the cloud-based token management process begins in block 301 wherein an Admin User operates the Admin User System 123 of FIG. 2 to connect to Cloud Computing Environment 101 and initiate an authentication process with the User Portal 102B. The authentication process can employ a single factor, multifactor, or other suitable authentication protocol as deemed appropriate. It is assumed that the Admin User is associated with certain elevated permission data (e.g., as part of the RBAC Table 103A stored in the Data Storage 103) relative to other non-admin users, including the management of user hardware tokens and associated role-based access by the non-admin users. In this manner, the elevated permission data allows the Admin User to perform the token and access management operations as described herein.

In block 303, the User Portal 102B determines whether the authentication process was successful and thus has successfully verified the identity of the Admin User. If not, the process continues to block 305 to deny the non-authenticated user access to further functionality of the User Portal 102B and the process ends. If so (i.e., the Admin User is authenticated), the process continues to block 307 and 311.

In block 307, the User Portal 102B registers the Admin User as being authenticated.

In block 309, the User Portal 102B initiates a query of the permissions data (i.e., RBAC table 103A in Data Storage 103) for permission data associated with authenticated Admin User.

In block 311, the User Portal 102B determines whether the permission data associated with the authenticated Admin User permits token and access management operations. It is assumed that such permission data would allow such operations. However, if not, the operations continue to block 313 to prohibit/block the Admin User from performing the token and access management operations and the process ends. If so, the operations continue to blocks 315 to 319.

In block 315, the Admin User can interact with the User Portal 102B to perform one or more of the tokens and access management operations. In embodiments, the token and access management operations can include adding a new user with new public key and corresponding hardware token, assigning one or more access roles to the new user, modifying the public key or hardware token of an existing user, modifying one or more access roles assigned to the existing user, revoking or deleting the public key or hardware token of an existing user, and/or deleting one or more access roles assigned to the existing user. Privilege or permissions for the token and access management operations performed by the Admin User can be governed by the permission data associated with the authenticated Admin User.

In embodiments, the cloud computing environment 101 can employ an access token to control the security for the token and access management operations performed by the Admin User in block 315. The access token is an object that describes the security context of a process or execution thread executed by the cloud computing environment 101 as part of the token and access management operations. Typically, the information in an access token includes the identity and privileges of the user that is executing the process or thread, and each process or thread executed on behalf of the user can have a copy of this access token. The cloud computing environment 101 can use this access token to evaluate the access privileges assigned to the Admin User when a process or thread executed on behalf of the Admin User initiates an operation or task that requires privileges.

In block 317, the Token Management Services 102A automatically updates the permission data (i.e., RBAC Table 103A) and/or the user public keys and other hardware token data 103B as stored in Storage 103 based on the token/access management operations performed by the Admin User in block 315. The permission data (i.e., RBAC Table 103A) can be updated for any new access role, or any change to an existing access role, as specified by the Admin User operations of block 315. The user public keys and other hardware token data 103B can be updated for any new user public key or new hardware token, or any change to a user public key or existing hardware token, as specified by the Admin User operations of block 315.

In block 319, the Token Management Services 102A automatically (i.e., without human involvement) synchronizes or pushes updates to the permission data (i.e., RBAC Table 103A) as well as updates to the user public keys and other hardware token data 103B to the gateway device 107 for storage therein as part of the permission data (i.e., RBAC Table 1131B) and user public keys and other hardware token data 113C. In embodiments, such automatic synchronization or update push can be configured to update the permission data (i.e., RBAC Table 113B) and user public keys and other hardware token data 113C of a particular gateway device with information regarding hardware tokens (or related users) that are deployed to the particular gateway device, such as information regarding newly registered hardware tokens deployed to the particular gateway device, changes to existing hardware tokens (or related users) deployed to the particular gateway device, and revocation of existing hardware tokens deployed to the particular gateway device. In embodiments, the automatic synchronization or push update of the permission data to the gateway device 107 can be performed when the gateway device 107 operates in its connected operational mode. If the gateway device 107 is operating in a disconnected operational mode when updates are made to the permission data (i.e., RBAC Table 103A) or made to the user public keys and other hardware token data 103B, such updates can be buffered or queued until the gateway device 107 is operably connected to the cloud computing environment 101 via the WAN(s) 105 in its connected operational mode.

Figure 4A:
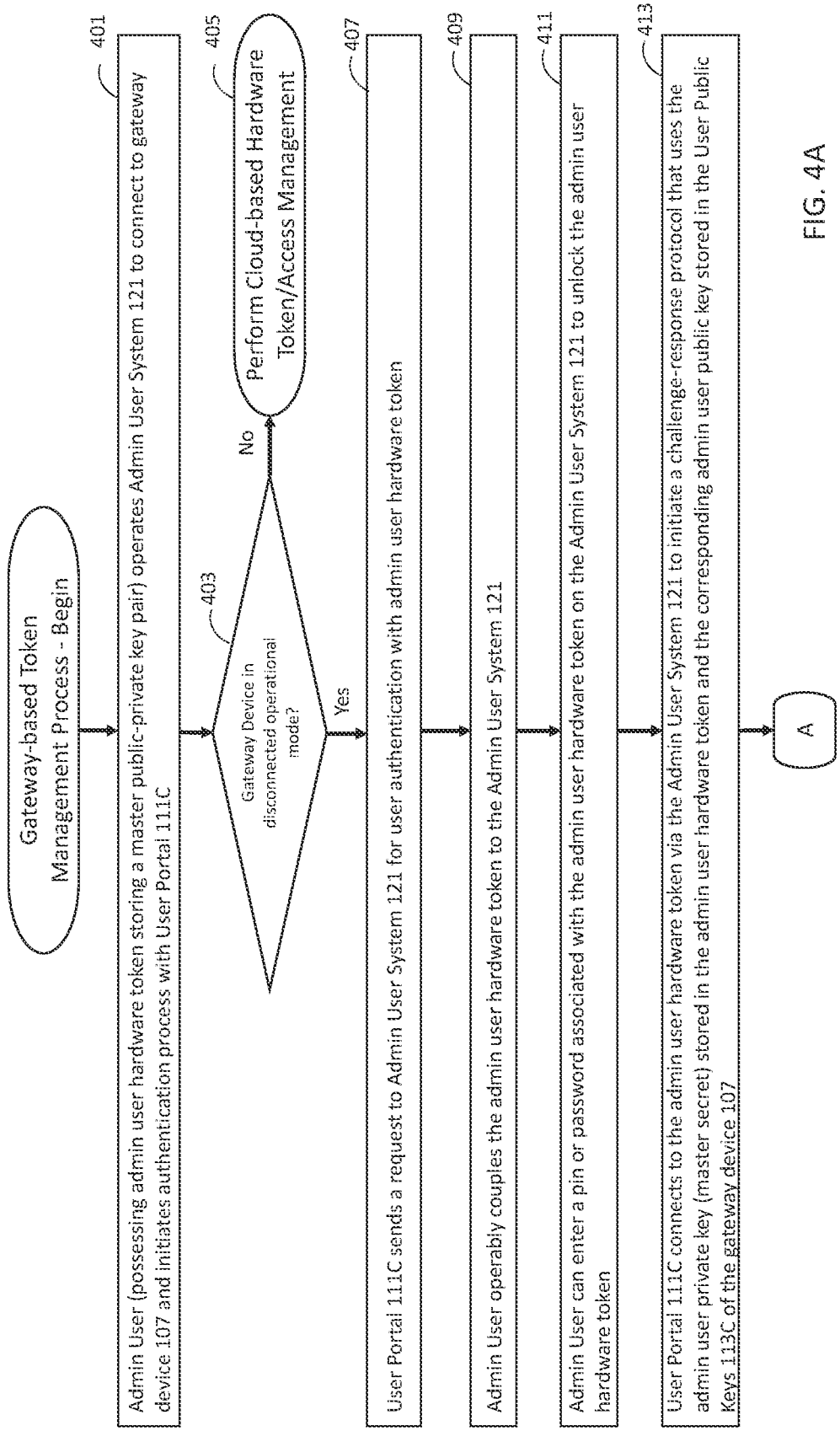
FIGS. 4A to 4C, collectively, is a flow chart of a gateway-based token management process that can be implemented by the gateway device of FIG. 2 in accordance with the present disclosure.
Figure 4B:
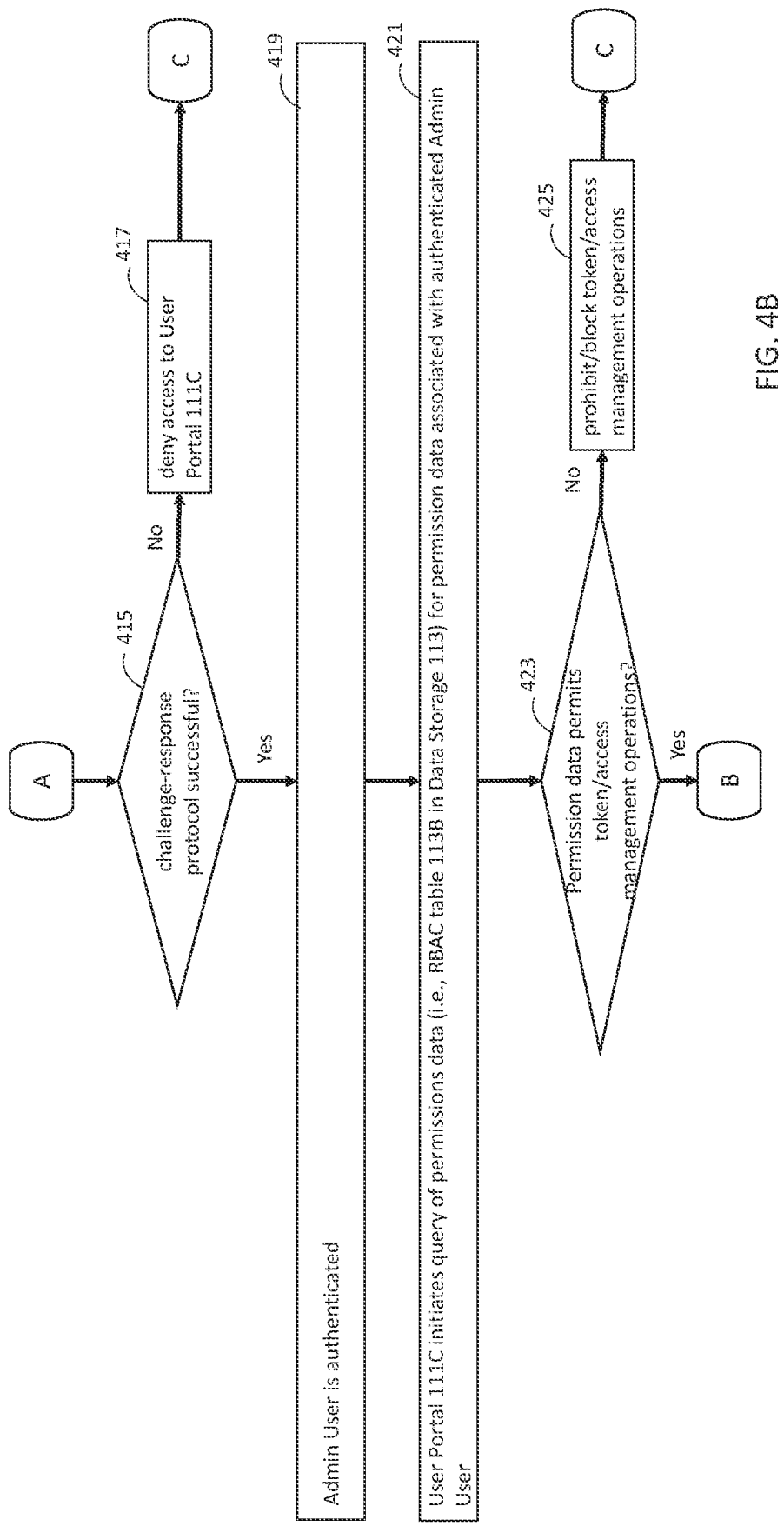
Figure 4C:
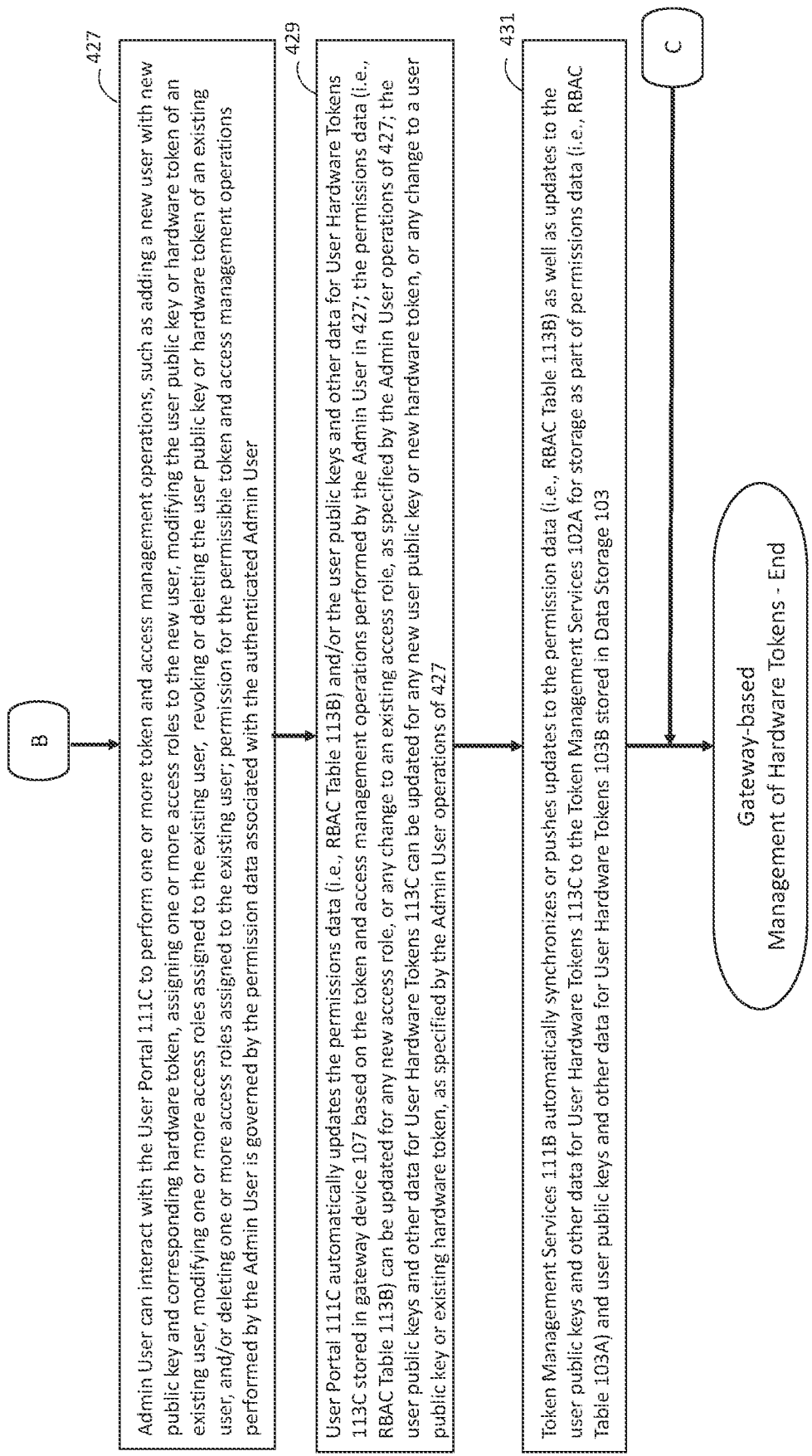

In embodiments, the second collection of services (i.e., token management services 111B and user portal 111C) implemented on the gateway device 107 can be configured to provide for a gateway-based token management process as illustrated in the flowchart of FIGS. 4A-4C.

More specifically, the gateway-based token management process begins in block 401 wherein an Admin User operates the Admin User System 121 of FIG. 2 to connect to the gateway device 107 via the LAN 117 and initiate an authentication process with User Portal 111C. It is assumed that the Admin User has an admin hardware token storing a master public-private key pair in his or her possession. This admin hardware token is intended to function as a master token that is associated with certain elevated permission data (e.g., as part of the RBAC Table 103A stored in the Data Storage 103)) relative to other non-admin users, including the management of user hardware tokens and associated role-based access by the non-admin users. In this manner, the elevated permission data allows the Admin User to perform the token and access management operations as described herein. In embodiments, the admin hardware token can be uniquely associated with a particular gateway device or group of gateway devices.

In block 403, the User Portal 111C checks on the status of the connection of the gateway device 107 to WAN(s) to determine if the gateway device 107 is operating in the disconnected operational mode where the gateway device 107 is disconnected (or non-operably connected) to the cloud-computing environment 101 via the WAN(s) 105. If not (i.e., the gateway device 107 is operably connected to the cloud-computing environment 101 via the WAN(s) 105), the operations continue to block 405 to perform the cloud-based token management process described above with respect to FIGS. 3A-3C. Otherwise (i.e., the gateway device 107 is operating in the disconnected operational mode), the operations continue to blocks 407 to 415.

In block 407, the User Portal 111C sends a request to the Admin User System 121 for user authentication with the admin user hardware token.

In block 409, the Admin User operably couples the admin user hardware token to the Admin User System 121, for example, using a USB or NFC or BLUETOOTH® connection as described herein.

In block 411, the Admin User can enter a pin or password or other credentials associated with the admin user hardware token on the Admin User System 121 to unlock the admin user hardware token.

In block 413, the User Portal 111C connects to the admin user hardware token via the Admin User System 121 to initiate a challenge-response protocol that uses the admin user private key (master secret) stored in the admin user hardware token and the corresponding admin user public key stored in the User Public Keys 113C of the gateway device 107.

In block 415, the User Portal 111C checks whether the challenge-response protocol was successful and thus successfully verified the identity of the Admin User. It can also verify that the admin hardware token is properly deployed for use with the gateway device 107. If the verification(s) is (are) not successful, the process continues to block 417 to deny the non-authenticated user access to further functionality of the User Portal 111C and the process ends. If the verification(s) is (are) successful, the process continues to blocks 419 to 423.

In block 419, the User Portal 111C registers the Admin User as being authenticated.

In block 421, the User Portal 111C initiates a query of the permissions data (i.e., RBAC table 113B in Data Storage 113) for permission data associated with authenticated Admin User.

In block 423, the User Portal 111C determines whether the permission data associated with the authenticated Admin User permits token and access management operations. It is assumed that such permission data would allow such operations. However, if not, the operations continue to block 425 to prohibit/block the Admin User from performing the token and access management operations and the process ends. If so, the operations continue to blocks 427 to 431.

In block 427, the Admin User can interact with the User Portal 111C to perform one or more of the token and access management operations. In embodiments, the token and access management operations can include adding a new user with a new public key and corresponding hardware token, assigning one or more access roles to the new user, modifying the public key or hardware token of an existing user, modifying one or more access roles assigned to the existing user, revoking or deleting the public key or hardware token of an existing user, and/or deleting one or more access roles assigned to the existing user. Privileges or permissions for the token and access management operations performed by the Admin User can be governed by the permission data associated with the authenticated Admin User.

In embodiments, the management and token management operations performed by the Admin User in block 427 can be limited to hardware tokens (or related users) that are deployed to the particular gateway device 107, such as registering new hardware tokens deployed to the particular gateway device, making changes to existing tokens (or related users) deployed to the particular gateway device, and revoking an existing token deployed to the particular gateway device.

In embodiments, gateway device 107 can employ an access token to control the security for the token and access management operations performed by the Admin User in block 427. The access token is an object that describes the security context of a process or execution thread executed by the gateway device 107 as part of the token and access management operations. Typically, the information in an access token includes the identity and privileges of the user that is executing the process or thread, and each process or thread executed on behalf of the user can have a copy of this access token. The gateway device 107 can use this access token to evaluate the access privileges assigned to the Admin User when a process or thread executed on behalf of the Admin User initiates an operation or task that requires privileges.

In block 429, the Token Management Services 111B automatically updates the permission data (i.e., RBAC Table 113B) and/or the user public keys and other hardware token data 113C as stored in Storage 113 based on the token and access management operations performed by the Admin User in block 429. The permission data (i.e., RBAC Table 113B) can be updated for any new access role, or any change to an existing access role, as specified by the Admin User operations of block 427. The user public keys and other hardware token data 113C can be updated for any new user public key or new hardware token, or any change to a user public key or existing hardware token, as specified by the Admin User operations of block 427.

In block 431, the Token Management Services 111B automatically (i.e., without human involvement) synchronizes or pushes updates to the permission data (i.e., RBAC Table 113B) as well as updates to the user public keys and other hardware token data 113C to the Token Management Services 102A for storage as part of permissions data (i.e., RBAC Table 103A) and user public keys and other hardware token data 103B stored in Data Storage 103. In embodiments, such automatic synchronization or push operations can be configured to update the permission data (i.e., RBAC Table 103A) and user public keys and other hardware token data 103B with information regarding hardware tokens (or related users) that are deployed to the particular gateway device, such as information regarding newly registered hardware tokens deployed to the particular gateway device, changes to existing hardware tokens (or related users) deployed to the particular gateway device, and revocation of existing hardware tokens deployed to the particular gateway device. In embodiments, the updates made to the permission data (i.e., RBAC Table 113B) or to the user public keys and other hardware token data 113C can be buffered or queued until the gateway device 107 is operably connected to the cloud computing environment 101 via the WAN(s) 105 in its connected operational mode.

Figure 5A:
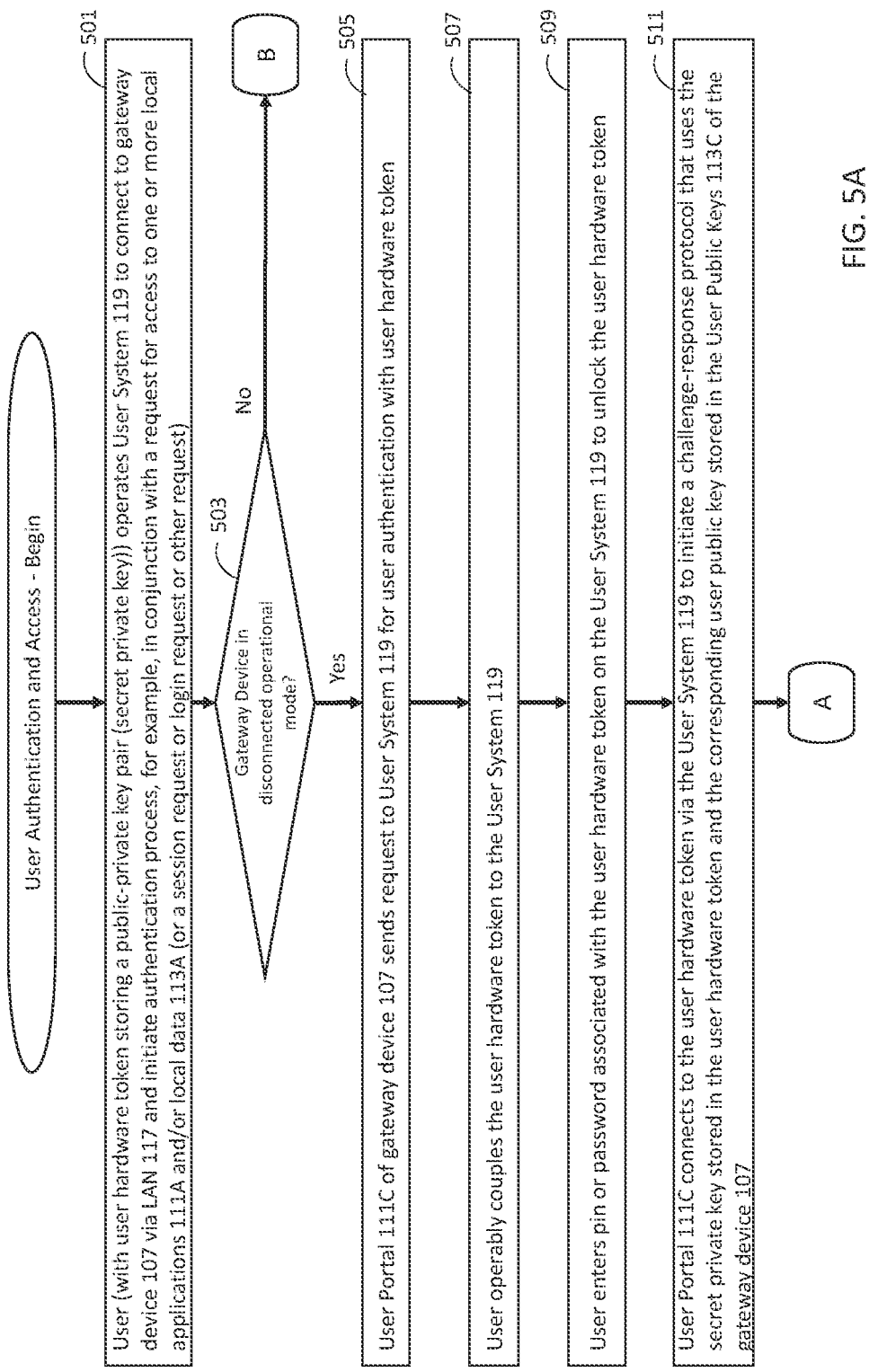
FIGS. 5A to 5C, collectively, is a flow chart of user authentication processes that employ user hardware tokens in accordance with the present disclosure.
Figure 5B:
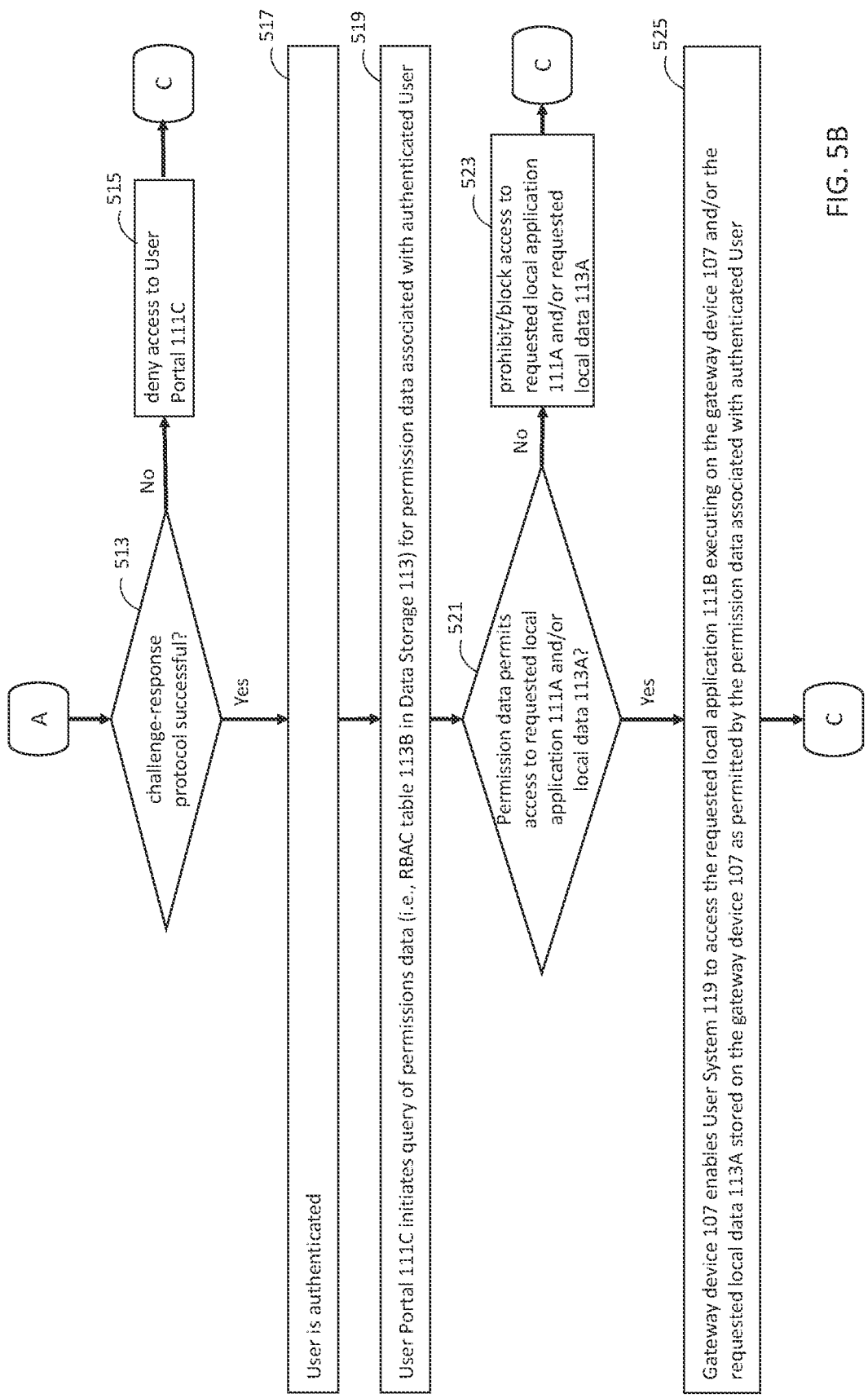
Figure 5C:
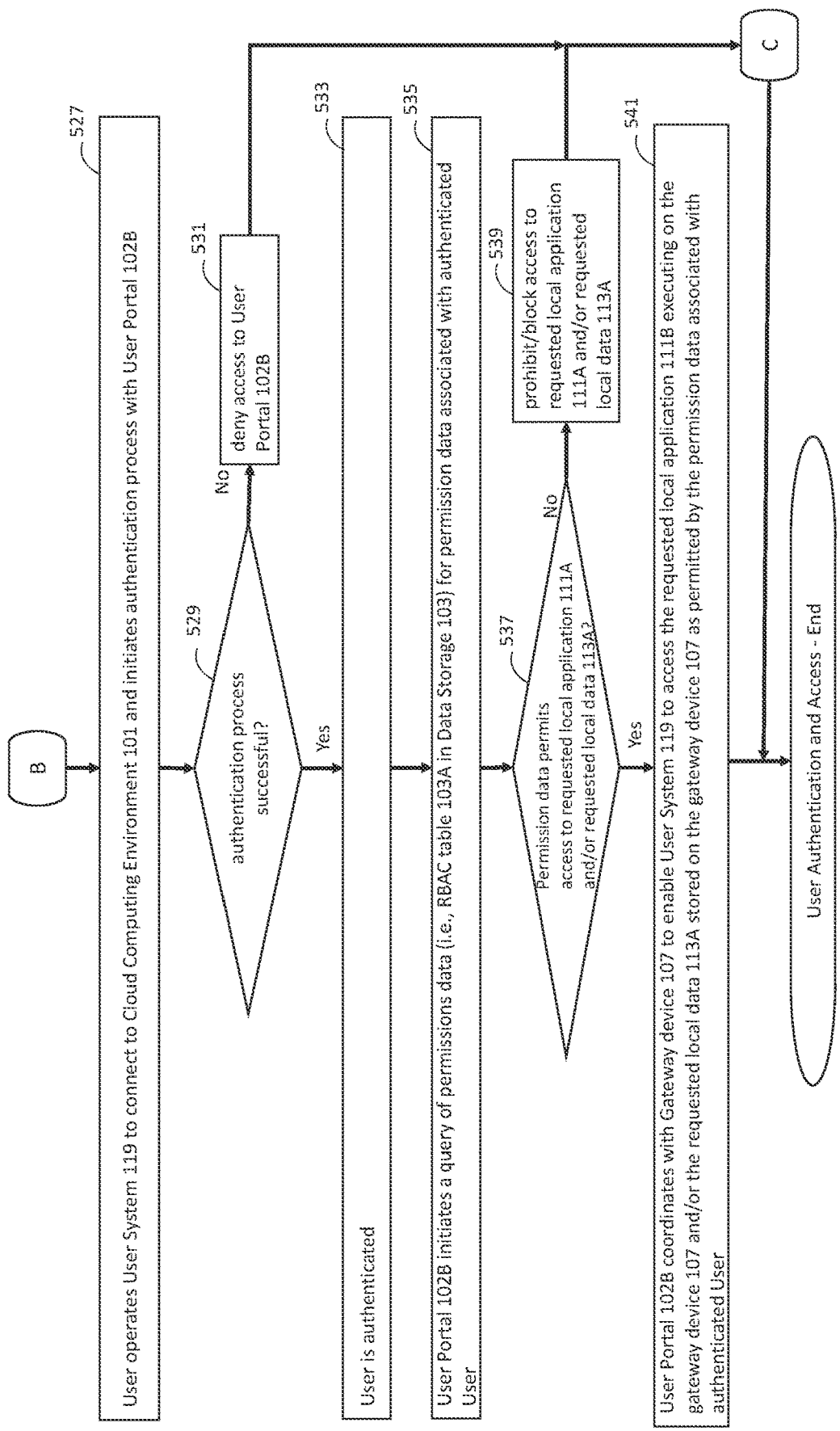

FIGS. 5A to 5C illustrate user authentication processes performed at both the gateway device 107 (in the disconnected operational mode of the gateway device 107) and the cloud computing environment 101 (in the connected operational mode of the gateway device 107). The user authentication processes control access to one or more local applications 111A and/or local data 113A on the gateway device 107.

The user authentication processes begin at block 501 where a User operates the User System 119 of FIG. 2 to connect to the gateway device 107 via LAN 117 and initiate an authentication process for the User in conjunction with a request from the User. Such request can be a request for access to one or more local applications 111A and/or local data 113A on the gateway device 107, a session request (e.g., for a new session between the User System 119 and the gateway device 107, a login request for the user, or some other request. It is assumed that the User has reduced permissions relative to Admin users and has in his or her possession a user hardware token storing a public-private key pair (secret private key).

In block 503, the User Portal 111C checks on the status of the connection of the gateway device 107 to WAN(s) to determine if the gateway device 107 is operating in the disconnected operational mode where the gateway device 107 is disconnected (or non-operably connected) to the cloud-computing environment 101 via the WAN(s) 105. If not (i.e., the gateway device 107 is operably connected to the cloud-computing environment 101 via the WAN(s) 105), the operations continue to block 527 as described below. Otherwise (i.e., the gateway device 107 is operating in the disconnected operational mode), the operations continue to blocks 505 to 513.

In block 505, the User Portal 111C sends a request to the User System 119 for user authentication with the user hardware token.

In block 507, the User operably couples the user hardware token to the User System 119, for example, using a USB or NFC or BLUETOOTH® connection as described herein.

In block 509, the User can enter a pin or password or other user credentials associated with the user hardware token on the User System 119 to unlock the user hardware token.

In block 511, the User Portal 111C connects to the user hardware token via the User System 119 to initiate a challenge-response protocol that uses the user private key (secret private key) stored in the user hardware token and the corresponding user public key stored in the User Public Keys 113C of the gateway device 107.

In block 513, the User Portal 111C checks whether the challenge-response protocol was successful and thus successfully verified the identity of the User. It can also verify that the hardware token is properly deployed to the gateway device 107. If the verification(s) of block 513 is (are) not successful, the process continues to block 515 to deny the non-authenticated user access to further functionality of the User Portal 111C and the process ends. In this manner, if a user has no hardware token, that user will not be able to authenticate himself or herself and will not be able to access the gateway device 107 or any data on the gateway device 107. Similarly, if a user has a hardware token but that hardware token is not deployed or registered to the gateway device 107, that user will not be able to access the gateway device 107 or any data on the gateway device 107. However, if the verification(s) of block 513 is (are) successful, the process continues to block 517.

In block 517, the User Portal 111C registers the User as being authenticated.

Blocks 519 to 525 are performed for the case where the request of block 501 involves a request for access to a local application 111A and/or local data 113A on the gateway device 107. Blocks 519 to 525 can also be performed in response to a subsequent request made by the authenticated User (i.e., after registering the User as being authenticated) for access to a local application 111A and/or local data 113A on the gateway device 107. In block 519, the User Portal 111C initiates a query of the permissions data (i.e., RBAC table 113B in Data Storage 113) for permission data associated with authenticated User. And in block 521, the User Portal 111C determines whether the permission data associated with the authenticated User permits access to the requested local application 111A and/or the requested local data 113A. If not, the operations continue to block 523 to prohibit/block the User from accessing the requested local application 111A and/or requested local data 113. If so, the operations continue to block 525 where the Gateway device 107 enables the User System 119 to access the requested local application 111B executing on the gateway device 107 and/or the requested local data 113A stored on the gateway device 107 as permitted by the permission data associated with authenticated User and the process ends.

In embodiments, the gateway device 107 can employ an access token to control the security for the execution of the requested local application 111B executing on the gateway device 107 and/or for access to the requested local data 113A in block 525. The access token is an object that describes the security context of a process or execution thread executed by the gateway device 107 as part of these operations. Typically, the information in an access token includes the identity and privileges of the user that is executing the process or thread, and each process or thread executed on behalf of the user can have a copy of this access token. The gateway device 107 can use this access token to evaluate the access privileges assigned to the User when a process or thread executed on behalf of the User initiates an operation or task that requires privileges.

Note that in the operations of FIGS. 5A and 5B, the gateway device 107 can be configured to operate as a policy decision/enforcement point in a zero-trust architecture access scheme. In a zero-trust architecture access scheme, resource protection is of paramount importance and trust is never granted implicitly but instead continually evaluated. The zero-trust architecture scheme is an end-to-end approach to enterprise resource and data security that encompasses identity (person and non-person entities), credentials, access management, operations, endpoints, hosting environments, and the interconnecting infrastructure. The scheme has an initial focus of restricting access to resources on network (whether it be applications or data) to those with a need to access and grant only the minimum privileges (e.g., read, write, delete) needed to perform the user's mission. In applying the zero-trust architecture access scheme to the IIoT gateway 107, the local machines 119, 121 that connect to the gateway device by the LAN(s) (and possibly the local devices and systems 115 that connect to the gateway 107 directly via the southbound communication interface(s) 109B) are considered to be located in an untrusted zone and require continual evaluation of trust via authentication and authorization for access to the local resources of the gateway device 107 as performed by the gateway device 107.

Turning to block 527, the User operates the User System 119 to connect to Cloud Computing Environment 101 via the LAN 117, the gateway device 107, and the WAN 105 and initiates an authentication process with User Portal 102B. The authentication process can employ a single factor, multifactor, or other suitable authentication protocol as deemed appropriate.

In block 529, the User Portal 102B determines whether the authentication process was successful and thus successfully verified the identity of the User. If not, the process continues to block 531 to deny the non-authenticated user access to further functionality of the User Portal 102B and the process ends. If so, the process continues to block 533.

In block 533, the User Portal 102B registers the User as being authenticated.

Blocks 535 to 541 are performed for the case where the request of block 501 involves a request for access to a local application 111A and/or local data 113A on the gateway device 107. Blocks 535 to 541 can also be performed in response to a subsequent request made by the authenticated User (i.e., after registering the User as being authenticated) for access to a local application 111A and/or local data 113A on the gateway device 107. In block 535, the User Portal 102B initiates a query of the permissions data (i.e., RBAC table 103A in Data Storage 103) for permission data associated with authenticated User. And in block 537, the User Portal 102B determines whether the permission data associated with the authenticated User permits access to requested local application 111A and/or to the requested local data 113A. If not, the operations continue to block 539 where the User Portal 102B coordinates with the gateway device 107 to prohibit/block the User System 119 from accessing the requested local application 111A and/or the requested local data 113A. If so, the operations continue to block 541 where the User Portal 102B coordinates with gateway device 107 to enable the User System 119 to access the requested local application 111B executing on the gateway device 107 and/or the requested local data 113A stored on the gateway device 107 as permitted by the permission data associated with authenticated User and the process ends.

In embodiments, the gateway device 107 can employ an access token to control the security for the execution of the requested local application 111B executing on the gateway device 107 and/or for access to the requested local data 113A in block 541. The access token is an object that describes the security context of a process or execution thread executed by the gateway device 107 as part of these operations. Typically, the information in an access token includes the identity and privileges of the user that is executing the process or thread, and each process or thread executed on behalf of the user can have a copy of this access token. The gateway device 107 can use this access token to evaluate the access privileges assigned to the User when a process or thread executed on behalf of the User initiates an operation or task that requires privileges.

Note that in the operations of FIG. 5C, the cloud computing environment 101 and the gateway device 107 can be configured to cooperate and operate as a policy decision point and enforcement point, respectively in a zero-trust architecture access scheme. In applying the zero-trust architecture access scheme to the IIoT gateway 107, the local machines 119, 121 that connect to the gateway device by the LAN(s) (and possibly the local devices and systems 115 that connect to the gateway 107 directly via the southbound communication interface(s) 109B) are considered to be located in an untrusted zone and require continual evaluation of trust via authentication and authorization for access to the local resources of the gateway device 107 as performed by the cooperation of the cloud computing environment 101 and the gateway device 107.

Figure 6:
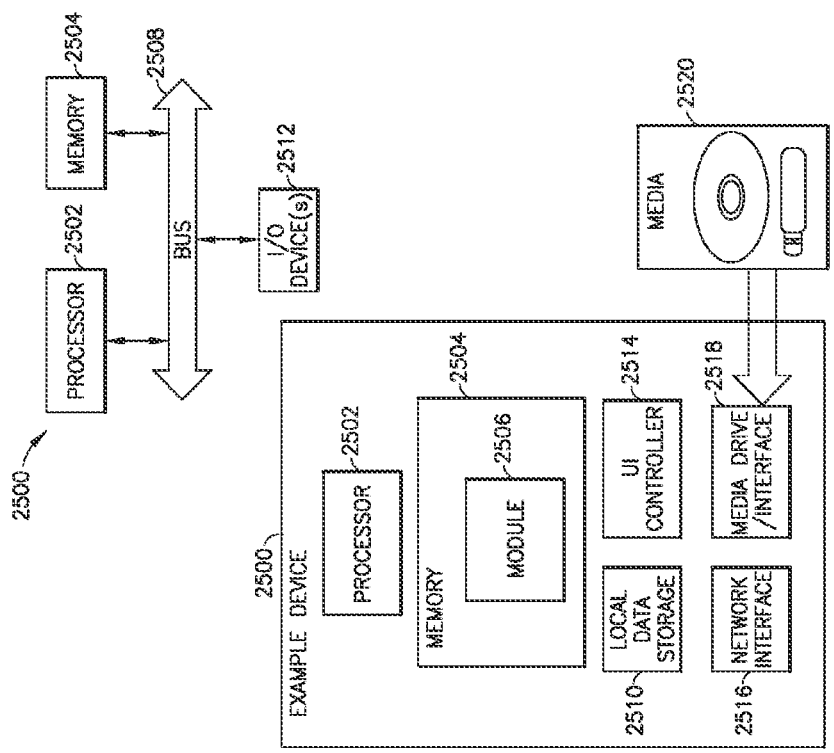
FIG. 6 is a schematic diagram of a computer system.

FIG. 6 illustrates an example device 2500, with a processor 2502 and memory 2504 that can be configured to implement various embodiments of the network-connected devices and systems and related methods and processes as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various devices and systems and processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer-readable media may thus comprise computer storage media. "Computer storage media" designates tangible media, and includes volatile and non-volatile, removable, and non-removable tangible media implemented for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer-executable form. Source code may include a series of computer program instructions in a variety of programming languages (e.g., an object code, an assembly language, or a high-level language such as C, C++, or JAVA). Such computer instructions can be stored in a non-transitory computer-readable medium (e.g., memory) and executed by the computer processor. The computer instructions may be distributed in any form as a removable storage medium with accompanying printed or electronic documentation (e.g., shrink-wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for user authentication on a gateway device located at an industrial site or facility, the gateway device including a southbound data communication interface to at least one local area network (LAN) at the industrial site or facility and a northbound data communication interface to at least one wide area network (WAN), the method comprising:
   i) at the gateway device, receiving a user request communicated via the LAN from a user system or device connected to the LAN;
   ii) at the gateway device, checking that the gateway device is operating in a disconnected operational mode in response to the user request;
   iii) at the gateway device, selectively initiating a user authentication protocol when the gateway device is operating in the disconnected operational mode, wherein the user authentication protocol uses secret information stored in a user hardware token registered at the gateway device uniquely assigned to a particular user, wherein the secret information stored in the user hardware token comprises a secret key, and wherein the user authentication protocol also uses other user information associated with the secret information of the user hardware token and stored in the gateway device via interaction of an administrator user with the gateway device;
   iv) at the gateway device, before registering the user hardware token, authenticating the administrator user using the user authentication protocol that requires administrator secret information stored in a master hardware token connected to a system or device operated by the administrator user, wherein:

the user authentication protocol that requires the administrator secret information stored in the master hardware token is used when the gateway device is operating in the disconnected operational mode; and the master hardware token is uniquely associated with a particular gateway device and used for authenticating the administrator user on the particular gateway device and permitting the administrator user to manage user hardware tokens via interaction with the particular gateway device; and v) at the gateway device, selectively authenticating the particular user based at least in part on results of the user authentication protocol.

2. The method according to claim 1, wherein:

the user hardware token securely stores a cryptographic public-private key pair with the private key of the key pair being the secret information stored in the user hardware token, and the public key of the key pair being the other user information associated with the secret information of the user hardware token and stored in the gateway device; and the user authentication protocol comprises a challenge-response protocol based on the cryptographic public-private key pair securely stored by the user hardware token.

3. The method according to claim 1, further comprising: automatically synchronizing or pushing information regarding the registered user hardware token to a cloud computing environment for storage on the cloud computing environment, wherein said information regarding the registered user hardware token includes the other user information associated with the secret information of the user hardware token.

4. The method according to claim 3, wherein:

the user hardware token is registered at the cloud computing environment and the other user information associated with the secret information of the user hardware token is stored in the cloud computing environment via interaction of the administrator user with the cloud computing environment.

5. The method according to claim 4, wherein:

in registering the user hardware token at the cloud computing environment, the user hardware token is deployed to a particular gateway device or group of gateway devices based on input from the administrator user; and destination of the automatic synchronizing or pushing of the information regarding the registered user hardware token at the cloud computing environment is configured to include the particular gateway device or group of gateway devices to which the user hardware token is deployed.

6. The method according to claim 1, further comprising: at a cloud computing environment, registering new user hardware tokens and changes or revocation of registered user hardware tokens, and automatically synchronizing or pushing information regarding newly registered user hardware tokens or changes or revocation of the registered user hardware tokens to the gateway device for update of the corresponding user hardware token information stored on the gateway device.

7. The method according to claim 1, further comprising:

vi) at the gateway device, controlling access to at least one application or data on the gateway device based on the selective authentication of the particular user; and storing role-based permission data for authorized users of the gateway device, wherein access control to the at least one application or data on the gateway device is further based on the role-based permission data for the particular user as stored on the gateway device.

8. A gateway device located at an industrial site or facility, the gateway device comprising:

a southbound data communication interface to local area network (LAN) at the industrial site or facility;

a northbound data communication interface to a wide area network (WAN);

a user authentication services circuitry configured to perform a user authentication process that involves:
  i) receiving a user request communicated via the LAN from a user system or device connected to the LAN,
  ii) checking whether the gateway device is operating in a disconnected operational mode in response to the user request,
  iii) selectively initiating a user authentication protocol when the gateway device is operating in the disconnected operational mode, wherein the user authentication protocol uses secret information stored in a user hardware token uniquely assigned to a particular user, and
  iv) selectively authenticating the particular user based at least in part on results of the user authentication protocol;

a registration services circuitry that interacts with an administrator user to register the user hardware token and store user information associated with the secret information of the user hardware token in the gateway device via interaction of the administrator user with the gateway device; and an administrator authentication services circuitry configured to authenticate the administrator user before registering the user hardware token, where the authentication uses the user authentication protocol that requires administrator secret information stored in a master hardware token connected to a system or device operated by the administrator user, wherein:

the user authentication protocol that requires the administrator secret information stored in the master hardware token is used when the gateway device is operating in the disconnected operational mode; and the master hardware token is uniquely associated with a particular gateway device and used for authenticating the administrator user on the particular gateway device and permitting the administrator user to manage user hardware tokens via interaction with the particular gateway device.

9. The gateway device according to claim 8, wherein:

the user hardware token securely stores a cryptographic public-private key pair with the private key of the key pair being the secret information stored in a user hardware token, and the public key of the key pair being the user information associated with the secret information of the user hardware token and stored in the gateway device.

10. The gateway device according to claim 8, further comprising: services circuitry configured to automatically synchronize or push information regarding the registered user hardware token to a cloud computing environment for storage on the cloud computing environment.

11. The gateway device according to claim 8, further comprising:

access control services circuitry that controls access to at least one application or data on the gateway device based on the selective authentication of the particular user; and data storage circuitry configured to store role-based permission data for authorized users of the gateway device, wherein the access to at least one application or data on the gateway device is further controlled based on the role-based permission data for the particular user as stored on the gateway device.

12. A system comprising:

a gateway device located at an industrial site or facility, the gateway device comprising:

a southbound data communication interface to local area network (LAN) at the industrial site or facility;

a northbound data communication interface to a wide area network (WAN);

a user authentication services circuitry configured to perform a user authentication process that involves:

i) receiving a user request communicated via the LAN from a user system or device connected to the LAN, ii) checking whether the gateway device is operating in a disconnected operational mode in response to the user request, iii) selectively initiating a user authentication protocol when the gateway device is operating in the disconnected operational mode, wherein the user authentication protocol uses secret information stored in a user hardware token uniquely assigned to a particular user, and iv) selectively authenticating the particular user based at least in part on results of the user authentication protocol;

a registration services circuitry that interacts with an administrator user to register the user hardware token and store user information associated with the secret information of the user hardware token in the gateway device via interaction of the administrator user with the gateway device; and an administrator authentication services circuitry configured to authenticate the administrator user before registering the user hardware token, where the authentication uses the user authentication protocol that requires administrator secret information stored in a master hardware token connected to a system or device operated by the administrator user, wherein:

the user authentication protocol that requires the administrator secret information stored in the master hardware token is used when the gateway device is operating in the disconnected operational mode; and the master hardware token is uniquely associated with a particular gateway device and used for authenticating the administrator user on the particular gateway device and permitting the administrator user to manage user hardware tokens via interaction with the particular gateway device.

13. The system according to claim 12, wherein a cloud computing environment automatically synchronize or push information regarding registered user hardware tokens to the gateway device for storage on the gateway device.

14. The system according to claim 13, wherein:

the information regarding registered user hardware tokens includes other user information associated with the secret information of a registered user hardware token; and the information regarding registered user hardware tokens further includes role-based permission data associated with the registered user hardware tokens.

* * * * *